March 16, 1965   G. A. McALISTER, JR   3,173,218
GEOMETRY TEACHING AID
Filed Dec. 6, 1962   3 Sheets-Sheet 2
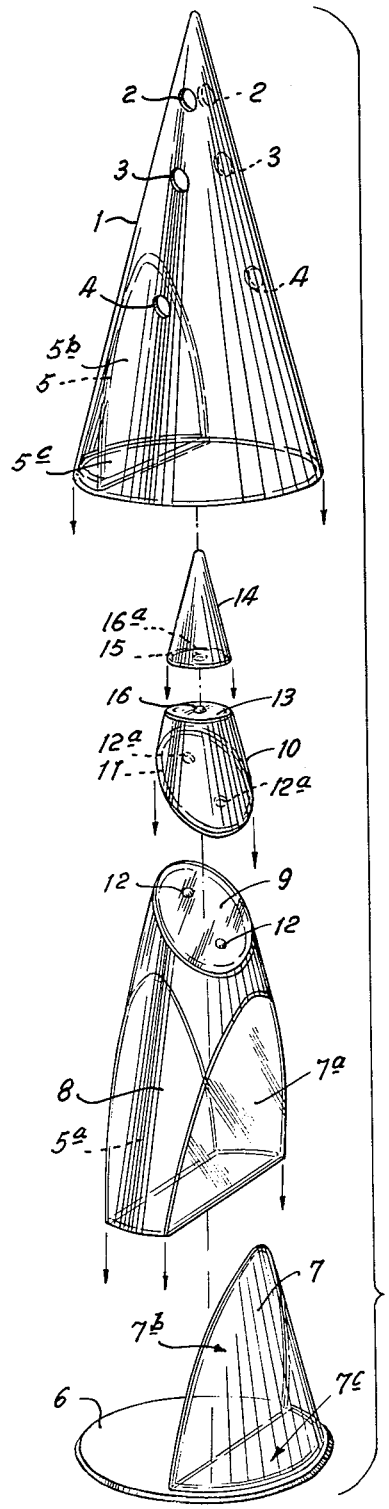
Fig. IV
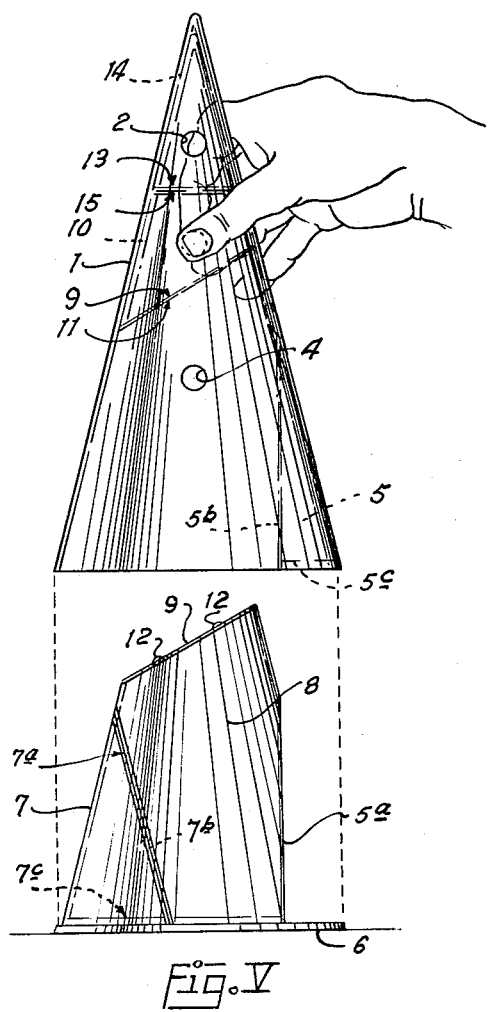
Fig. V
INVENTOR
George A. McAlister, Jr.
BY Howard E. Moore
ATTORNEY March 16, 1965     G. A. McALISTER, JR     3,173,218
GEOMETRY TEACHING AID
Filed Dec. 6, 1962     3 Sheets-Sheet 3
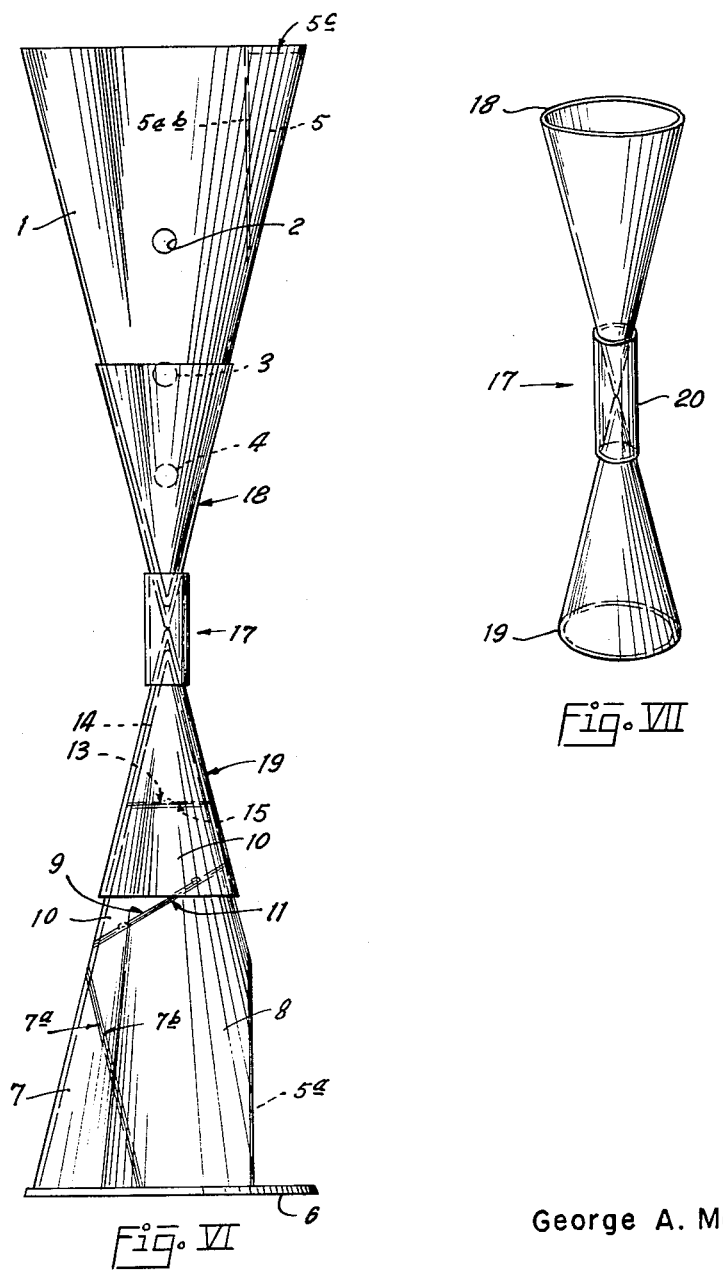
*INVENTOR*
George A. McAlister, Jr.
BY Howard E. Moore
*ATTORNEY*

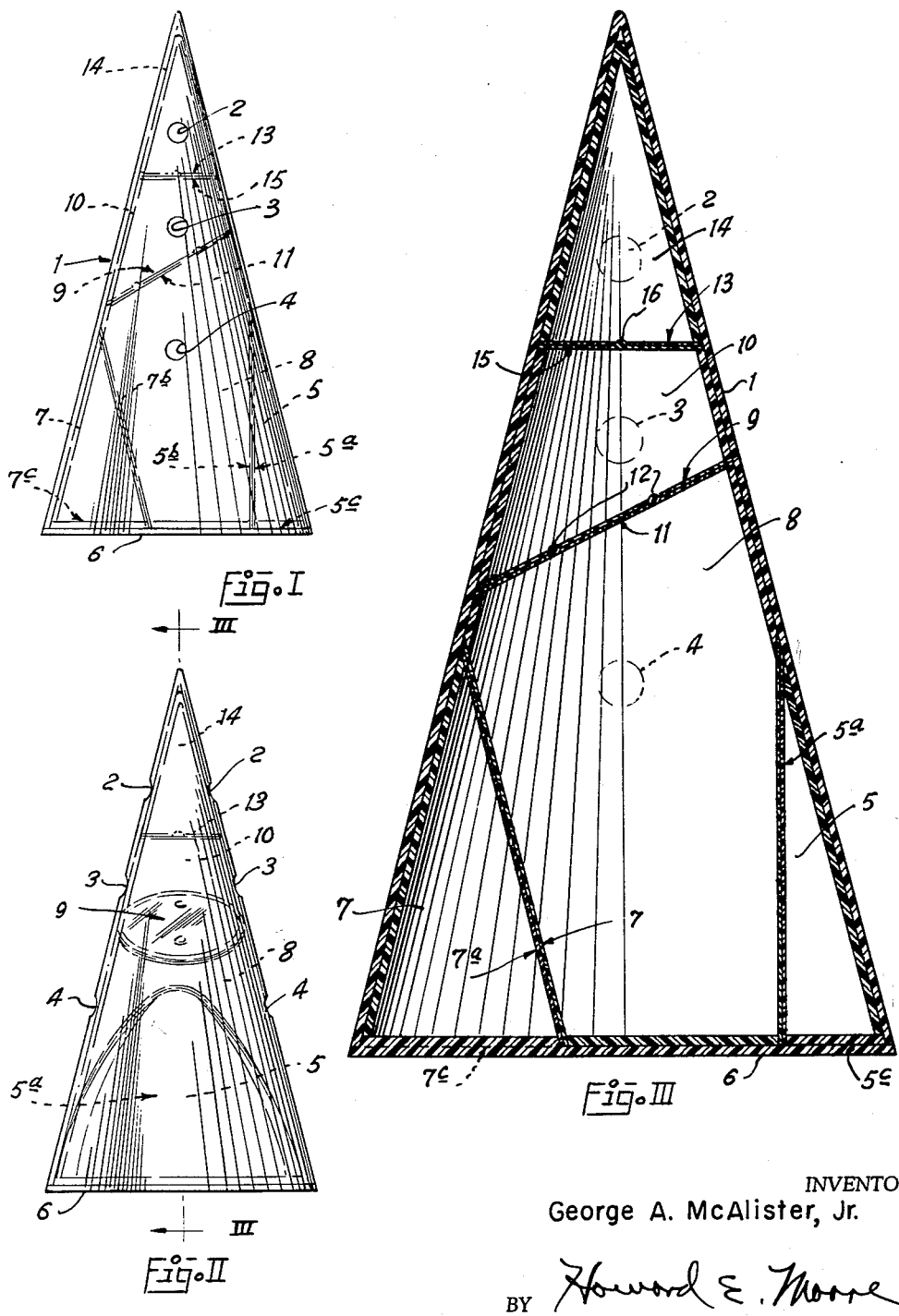

United States Patent Office 3,173,218
Patented Mar. 16, 1965

3,173,218
GEOMETRY TEACHING AID
George A. McAlister, Jr., Big Spring, Tex., assignor to Math-Master Labs, Inc., Big Spring, Tex., a corporation of Texas
Filed Dec. 6, 1962, Ser. No. 242,758
3 Claims. (Cl. 35—34)

This invention has to do with a device to be used by instructors as an aid in teaching geometry, and is particularly concerned with a teaching aid illustrating various geometric forms which may be derived by sectioning a cone.

In teaching geometry, it has been found that students more easily grasp the concepts and theorems thereof, if the different geometric forms are illustrated in three-dimensions rather than by attempting to illustrate them by a one-dimensional drawing. This is particularly true with reference to the special conic sectional forms, such as hyperbolas, parabolas, and ellipses. In the past dissectable cones of wood or plastic have attempted to exhibit these conic sections by use of pegs or magnets to attach them together.

The present invention is intended to provide a teaching aid which incorporates all of the commonly found geometric forms which may be derived by sectioning a cone in a device which is so constructed that they may be observed in their assembled relationship inside a transparent envelope cone, or they may be divided into separate components or sub-components, as selected, to illustrate in three dimensional forms the said geometrical constructions without the use of pegs or magnets to hold them together.

It is, therefore, a primary object of the invention to provide a teaching aid for illustrating by three-dimensional forms the various geometric forms which may be derived by sectioning a cone.

Another object of the invention is to provide a teaching aid wherein various geometrical forms which may be derived by sectioning a cone are so assembled with relation to a transparent envelope cone that any individual form or combination of forms may be selectively picked up with the envelope cone or allowed to remain in assembled position to illustrate the various components and subcomponents of the geometric forms which may be derived from a cone.

A still further object is to provide three-dimensional geometric forms constituting parts derived by sectioning a cone, wherein the surfaces of the geometric forms may be easily viewed in assembled or disassembled position, and may be easily disassembled for illustration and observation.

Other and further objects of the invention will become apparent upon reading the detailed specification hereinafter following, and by referring to the drawings annexed hereto.

A suitable embodiment of the invention is shown in the attached drawings wherein:

FIGURE I is a side elevational view of the geometry teaching aid in assembled position;

FIGURE II is a side elevational view taken at right angle to the view shown in FIGURE I;

FIGURE III is a cross-sectional, elevational view taken on the line III—III of FIGURE II;

FIGURE IV is an exploded view of the geometric teaching aid showing the various components thereof;

FIGURE V is a side elevational view showing the manner in which selected ones of the geometric forms, making up the inner segmented cone, may be lifted with the envelope cone as desired;

FIGURE VI is a side elevational view of a modified form wherein an inverted connector cone assembly is employed to connect the segmented cone and the envelope cone with the envelope cone in inverted position; and FIGURE VII is a side elevational view of the connector cone assembly employed in the form shown in FIGURE VI.

Numeral references are employed to designate the various parts shown in the drawings, and like numerals indicate like parts throughout the various figures of the drawings.

The various components of the teaching aid hereinafter described are preferably made of transparent plastic material, for the purposes which will be made clear as the description progresses. However, it will be understood that the device would have utility even though the components thereof were made of opaque material.

As best seen in exploded view of FIGURE IV, the numeral 1 indicates an envelope cone for the device, made of transparent plastic material. The envelope cone 1 is provided with spaced grasping holes 2, 3 and 4, which are preferably oppositely disposed in pairs for the purposes which will be hereinafter mentioned.

Attached inside the envelope cone 1, and coinciding with the opening through the base of the cone, is a hyperbola-shaped sector 5, which is three-dimensional, and is also made of transparent plastic material. Surfaces 5b and 5c of the hyperbola sector 5 are preferably colored with a selected transparent color to make same translucent, so that the outlines of the hyperbola may be easily viewed through the wall of the transparent envelope cone 1. When the device is assembled as shown in FIGURES I–III, the surface 5b coincides with surfaces 5a on the sector 8. Surface 5a is preferably colored with the same transparent color as 5b, so that the outline of the hyperbola may be viewed on the sector 8 in unassembled position, or in assembled position.

The teaching aid includes a cone made up of separable segments, as shown in exploded view of FIGURE IV, and in assembled position of FIGURES I–III, which when assembled, is arranged to be enclosed within the envelope cone 1.

The segmented cone includes a base segment 6 on which is mounted a parabola shaped sector 7. The sector 7 preferably has differently colored translucent surfaces 7b and 7c, and is three-dimensional in shape. The inner flat surface 7b is arranged to coincide with the parabola shaped surface 7a on the segment 8. The surface 7a is also colored the same translucent color as flat surfaces 7b and 7c, so that when the segmented cone is either assembled or disassembled with relation to the envelope cone, the parabola shape can be seen visually either inside the envelope cone or separately.

The segment 8 has an angularly disposed upper end to provide an elliptical shaped surface 9. The elliptical shaped surface 9 is preferably colored with a different translucent color than the surfaces hereinbefore mentioned. The surface 9 is arranged to coincide with an elliptical surface 11 on the cone sector 10. The elliptical surface 11 is preferably colored the same translucent color as the surface 9, so that the ellipse can be observed either on the sector 8 or on the sector 10.

In order to disengageably connect the surfaces 9 and 11 of the sectors 8 and 10 to hold them in assembled position, when the envelope cone 1 is removed therefrom, there is provided on the upper surface of the elliptical area 9 rounded knobs 12 which are arranged to coincide with, and enter, holes or recesses 12a provided in the elliptical surface 11.

The segment 10 is also provided with a circular surface 13 at the upper end thereof. The surface 13 is preferably colored a different translucent color from the surfaces hereinbefore mentioned; and is arranged to coincide with the circular surface 15 on the lower face of the upper cone segment 14. The surface 15 is also colored the same translucent color as the surface 13 so that the circular shape can be visualized either when the segmented cone is assembled within the transparent cone 1, or when the segments are separated.

In order to hold the segments 10 and 14 in assembled position when the envelope cone 1 is removed therefrom, there is provided a disengageable connection comprising a rounded knob 16 centrally of the upper side of circular surface 13, which is arranged to enter and coincide with the hole or recess 16a provided centrally of the circular surface 15.

The operation and function of the geometry teaching aid hereinbefore described is as follows:

The separate sectors 6, 8, 10 and 14 may be assembled together as shown in FIGURES I–III, to provide a segmented cone, and the transparent envelope cone 1 is placed thereover. In such position the various geometrical forms and surfaces may be easily viewed and distinguished from the transparent cone 1, inasmuch as the said geometric forms and surfaces have different transparent colors. Thus there is illustrated the various geometric forms which may be derived by sectioning a cone.

If it is desired to demonstrate different sectors or surfaces, or combinations thereof, derived by sectioning a cone, this may be quickly and easily done by placing the thumb and finger in oppositely disposed pairs of holes 2, 3, or 4 as may be selected, as shown in FIGURE V, and pressing in slightly and picking up the envelope cone, carrying with it the sector inside the cone engaged by the thumb and finger and the cone sector thereabove.

As shown in FIGURE V the sectors 10, 14 and 5 have been picked up, leaving the base sector 6 and the next adjacent sector 8, which illustrates a form having a base sector 6, the next adjacent sector 8, and the parabola sector 7, wherein there is shown the parabola form, the hyperbola surface form 5a, and the elliptical surface 9. These forms, with the hyperbolic sector 5 in assembled relationship with the surface 5a, also illustrate a truncated cone.

By placing the thumb and finger in opposite holes 2 and pressing inwardly and picking up to remove the sector 14 with the envelope cone 1, would provide a frustrum of a right cone, and by placing a finger and thumb in the holes 4 and picking up the envelope cone 1, there will be left the base segment 6 and the parabola sector 7, and the hyperbola sector 5 can be viewed in the cone 1. If desired, the hyperbola sector 5 could be made a part of the base 6, or both the parabola sector 7 and hyperbola sector 5 could be made separate and positioned in the base 6 or attached inside the envelope cone, as may be desired.

It will thus be seen that the assembly shown in FIGURES I–V provides a simple and effective means for teaching by visual and manual handling the different geometric forms derived from sectioning a cone, which may be visibly seen in three-dimensional form and will be more easily understood by the student.

A modified form is shown in FIGURES VI and VII, wherein there is provided a coupling cone assembly 17, comprising two end to end relatively short cones 18 and 19, which are joined by a sleeve member 20. These elements are also made of transparent material. The purpose of this modification is to provide means whereby the envelope cone 1 may be placed with the apex toward the assembled segmented cone in a manner so that the envelope cone and segmented cone are joined together, and the different geometric forms may be visualized, and at the same time will illustrate the other half of the hyperbola 5; or the parabola 7 may be placed in the end of the envelope cone 1 to illustrate the other end of the parabola. If desired the other half of the hyperbola or parabola could be shown by separate sectors detachably attached in the open end of the envelope cone and assembled as shown in FIGURE VI.

It will thus be seen that I have provided a geometry teaching aid which is most effective, simple to use and inexpensive to manufacture, and which is very flexible in its use.

Having described my invention, I claim:

1. In a geometry teaching aid, a cone made of transparent material divided into separable segments having corresponding surfaces on adjoining segments representing different geometrical forms; an envelope cone made of transparent material arranged to fit over the segmented cone; inter-engageable means on the adjoining surfaces between the segments to hold the segments together when the envelope cone is removed; the adjoining surfaces between separate segments being colored with transparent colors so that they can be easily viewed and distinguished through the envelope cone; and oppositely disposed pairs of grasping holes provided through the wall of the envelope cone adjacent each of the segments to permit the envelope with the segment adjacent a selected pair of holes, and segments thereabove, to be picked up by engaging the segment opposite the selected pair of holes with the fingers through the said selected pair of holes.

2. The combination called for in claim 1 with the addition of a joinder member comprised of inverted cones joined at their apexes, with said joinder member having one cone positioned over the apex of the segmented cone, and the other cone positioned over the apex of the envelope cone to provide inverted cones with the apexes joined wherein one of the cones is a segmented cone.

3. The combination called for in claim 1 wherein the geometric surfaces are in the form of a hyperbola, a parabola, an ellipse, and a circle.

References Cited by the Examiner

UNITED STATES PATENTS 595,455  12/97  Glidden _____ 35—34 X

FOREIGN PATENTS 18,335 of 1903  5/04  Great Britain.
21,505  12/92  Great Britain.

OTHER REFERENCES

The Welch Physics and Chemistry Digest, vol. 5, No. 2, page 27, April 1955.

Physics Research Laboratories, Inc., publication "Transparent Visual-Aids," 4 pages, pages 1 and 4.

JEROME SCHNALL, *Primary Examiner.*

LAWRENCE CHARLES, *Examiner.*